United States Patent [19]

Palmer

[11] 4,440,965

[45] Apr. 3, 1984

[54] POLYMER LUBRICANTS

[75] Inventor: Richard F. Palmer, Camas, Wash.

[73] Assignee: Phillips Petroleum Company, Bartlesville, Okla.

[21] Appl. No.: 379,406

[22] Filed: May 18, 1982

[51] Int. Cl.$^3$ .............................................. C07C 1/16
[52] U.S. Cl. ..................... 585/12; 184/109; 585/16; 585/18; 585/24; 585/255
[58] Field of Search ...................... 585/12, 16, 18, 24, 585/255, 507; 184/1 E

[56] References Cited

U.S. PATENT DOCUMENTS

| | | | |
|---|---|---|---|
| 3,324,191 | 6/1967 | Wofford | 585/507 |
| 3,356,754 | 12/1967 | Wofford . | |
| 3,360,580 | 12/1967 | Mertzweiller et al. | 585/507 |
| 3,624,175 | 11/1971 | Zuech . | |
| 4,041,088 | 8/1977 | Bach et al. | 526/75 |
| 4,049,732 | 9/1977 | Bach et al. | 526/75 |
| 4,060,492 | 11/1977 | Yasui et al. | 585/276 |
| 4,061,780 | 12/1977 | Yoshida et al. | 424/358 |
| 4,078,010 | 3/1978 | Prillieux et al. | 252/73 |

OTHER PUBLICATIONS

Chem. Abs., 69, 14843, (1968), (Pichuzhkin et al.).

*Primary Examiner*—Curtis R. Davis

[57] ABSTRACT

Hydrogenated 1,3-butadiene polymers are used as synthetic lubricants. The polymers of this invention range in molecular weight from about 150 to about 3,000 and are characterized by a 1,2 addition structure of at least about 60 percent.

13 Claims, No Drawings

POLYMER LUBRICANTS

BACKGROUND

Today, synthetic lubricants share with petroleum lubricants the very large world-wide lubricant market. The use of synthetic lubricants has grown significantly since the 1940's when ester, polyglycol and silicone lubricants were developed. Even earlier, about 1929, polymerized olefins were commercially used as lubricants.

Synthetic lubricants have been especially important in applications necessitating exposure to extreme temperatures since petroleum lubricating oils tend to oxidize rapidly above about 100° to 125° C. and to develop problems of wax separation and high viscosity at temperatures below about −20° to −30° C. For this reason synthetic lubricants are used, for example, in jet engines.

In applications where extreme conditions demand high performance requirements synthetic lubricants outcompete petroleum lubricants to the virtual exclusion of the latter. However, in other applications (which represent most of the lubricant market) such as in automobile engines, synthetic lubricants have captured only a modest, but growing, share. The advantages of a synthetic lubricant in automotive engines include (1) more miles between oil changes because of greater inherent thermal stability; (2) fewer temperature limitations because of lower volatility and pour points; (3) more economical use of fuel; and (4) better compliance with environmental restrictions placed upon automotive manufacturers. Because of these and other advantages it is widely believed that the use of synthetic lubricants will increase extensively over the years. New and improved synthetic lubricants are expected to contribute to this growth.

Known synthetic lubricants include certain hydrocarbons, organic esters, polyglycols, phosphates, silicones, fluorochemicals and other fluids (such as polyphenyl ethers and silicate esters). The focus of my invention is directed towards the first of the above-identified general areas, i.e. synthetic hydrocarbon lubricating oils. Hydrocarbons known and used as synthetic lubricants include alkylated benzenes, polyisobutylene oils and polymers of various other alpha olefins and of ethylene.

Two desirable properties of a synthetic lubricant are (1) a low pour point and (2) a high viscosity index.

The pour point of a lubricant represents the lowest temperature at which the lubricant will flow by gravity from a specified container under standard conditions. A low pour point is desired because it allows low temperature use of the lubricant.

A synthetic hydrocarbon lubricant having a pour point of less than about 10° C. is generally desired. Preferably the pour point will be below about −10° C. and most preferably below about −20° C. The pour point of a lubricant can be lowered by as much as 30° C. or more by adding a relatively small amount of a pour point depressant such as, for example, polymethacrylates or polymers formed by Friedel-Crafts condensation of wax with naphthalene or phenol.

The viscosity index of a lubricant is an empirical measure of the decrease in viscosity of a lubricant corresponding to increasing temperature. The smaller the change in viscosity with changing temperature the greater the viscosity index. Similarly, the greater the change in viscosity with changing temperature the smaller the viscosity index. A high viscosity index is desired because it allows use of the lubricant over a wide temperature range.

A synthetic hydrocarbon lubricant having a viscosity index of at least about 80 is generally desired. However, a lubricant having a lower viscosity index may be useful for cold weather applications if the lubricant has a very low pour point. Viscosity index improvers such as, for example, polymethacrylates and polyalkylstyrenes (having molecular weights ranging from about 45,000 to about 1,700,000), can be utilized to increase the viscosity index of a given lubricant by as much as 50 units or more.

SUMMARY OF MY INVENTION

My invention relates to hydrogenated 1,3-butadiene polymer synthetic lubricants. The hydrogenated polymers of my invention are characterized by a 1,2-addition structure of at least about 60% and an average molecular weight within the range of about 150 to about 3,000 and preferably within the range of about 280 to about 600.

My invention also relates to synthetic lubricants of the following formula

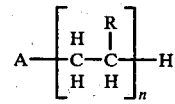

where A is a negative ion such as, for example, $CH_3(CH_2)_3-$ or

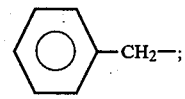

n is a whole number greater than 2; and each R in each

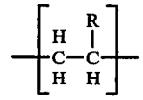

group is independently selected from H and $CH_3CH_2-$ such that at least about 60% of the R's in the above-defined polymer are $CH_3CH_2-$. The polymer has an average molecular weight within the range of about 150 to about 3,000 and preferably within the range of about 280 to about 600.

OBJECTS OF THE INVENTION

It is an object of my invention to provide a novel synthetic lubricant.

It is a further object of my invention to provide a synthetic lubricant characterized by a low pour point.

These objects and other objects and advantages of my invention will be apparent to those persons of ordinary skill in the art upon a careful study of this disclosure and the appended claims.

INVENTION

In accordance with my invention certain hydrogenated 1,3-butadiene polymers or mixtures thereof are used as synthetic lubricants. The polymers useful for the purpose of my invention have a molecular weight within the range of about 150 to about 3,000 and preferably within the range of about 280 to about 600. Mixtures of these polymers having an average molecular weight within the above defined ranges are also contemplated to be within the scope of my invention.

An understanding of the chemistry underlying the formation of these butadiene polymers is necessary to an understanding of the definition of those polymers which upon hydrogenation yield an acceptable synthetic lubricant. One suitable method for the polymerization of these polymers is anionic polymerization.

The anionic polymerization of 1,3-butadiene has been extensively investigated by numerous persons of skill in the art. The following is an introduction to the chemistry of the processes I employed to prepare 1,3-butadiene polymers suitable for hydrogenation to produce synthetic lubricants.

The chemical formula of the 1,3-butadiene monomers from which the polymers of my invention are derived is:

$$H_2C=\overset{H}{\underset{|}{C}}-\overset{H}{\underset{|}{C}}=CH_2 \text{ (1,3-butadiene monomer)}$$

Initiation is triggered by the addition of a negative ion (such as, for example, an alkyl anion or a benzylic anion) to 1,3-butadiene to generate an allylic anion as shown in equation I. In this equation $A^-$ represents an anion and $M^+$ represents a metal cation.

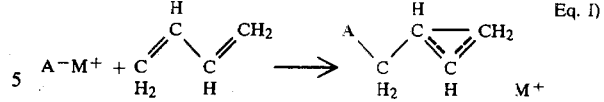

The product of equation I can react further with another 1,3-butadiene monomer by any of the three different modes of linkage or addition shown in equation II.

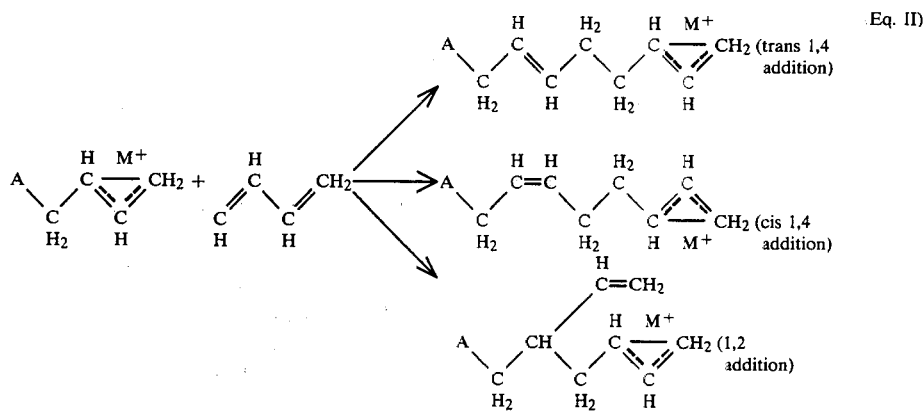

The polymer can continue to grow by further reaction (in accordance with equation II) with other monomers. This step by step addition continues until termination or until all available monomer is consumed. By controlling the ratio of monomer to initiator the average molecular weight of the polymer can be controlled.

For any given growing polymer molecule the mode of addition can vary with each subsequent addition step. Thus a polymer can be characterized by any combination of the three modes of addition. The extent to which each mode occurs is a function of such variables as, for example, the anionic initiating species $A^-$, the associated metal cation $M^+$, solvent, complexing agents and reaction conditions.

Hydrogenation of either the trans 1,4 or cis 1,4 linkage produces a linear polymer as shown in equation III.

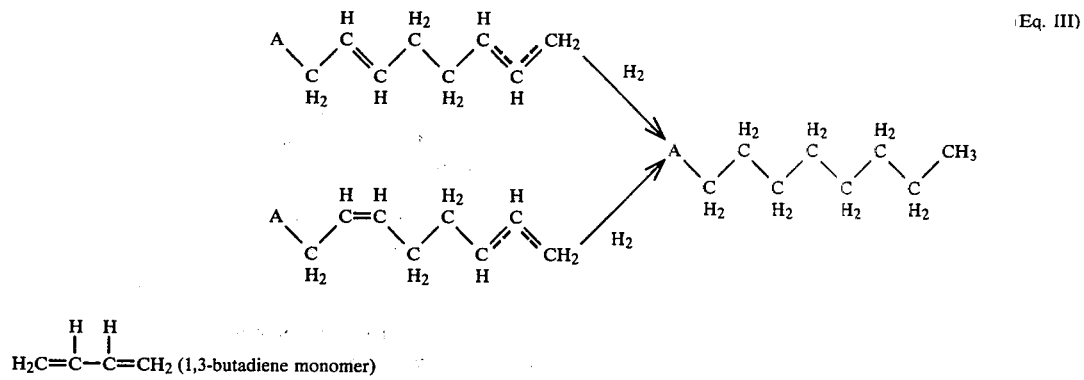

Hydrogenation of the 1,2 linkage produces an ethylbranched polymer as shown in equation IV.

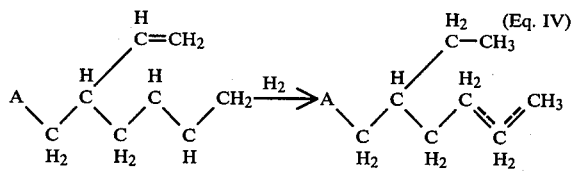

(Eq. IV)

The extent of branching in a given polymer is directly dependent upon the extent of 1,2 addition that occurs during the formation of the polymer. It follows then from equation IV that the ethyl branching in a hydrogenated polymer is also coextensive with the occurrence of 1,2 addition. Because both the trans 1,4 and cis 1,4 addition modes yield a linear product upon hydrogenation only the total amount of 1,4 linkage need be considered for the purposes of this aspect of the relevant chemistry.

Organolithiums can be used as the initiating species $A^-M^+$. They are preferred because of their availability and their solubility in hydrocarbon solvents. Examples of organolithium compounds include:

| | |
|---|---|
| methyllithium | 1,4-dilithiobutane |
| isopropyllithium | 1,10-dilithiodecane |
| n-butyllithium | 1,20-dilithioeicosane |
| sec-butyllithium | 1,4-dilithiocyclohexane |
| tert-octyllithium | 1,4-dilithio-2-butene |
| n-decyllithium | 1,8-dilithio-3-decane |
| phenyllithium | 1,4-dilithiobenzene |
| naphthyllithium | 1,2-dilithio-1,2-diphenylethane |
| 4-butylphenyllithium | 1,2-dilithio-1,8-diphenyloctane |
| p-tolyllithium | 1,3,5-trilithiopentane |
| 4-phenylbutyllithium | 1,5,15-trilithioeicosane |
| cyclohexyllithium | 1,3,5-trilithiocyclohexane |
| 4-butylcyclohexyllithium | 1,3,5,8-tetralithiodecane |
| 4-cyclohexylbutyllithium | 1,5,10,20-tetralithioeicosane |
| dilithiomethane | 1,2,4,6-tetralithiocyclohexane |
| | 4,4'-dilithiobiphenyl |

Of the above-identified organolithiums the alkyl lithiums are preferred, especially n-butyllithium. Other suitable initiators are known in the art and are within the scope of this invention.

The polymerization preferably takes place in the presence of a hydrocarbon solvent such as, for exmple, any one of the following (or combination thereof):

| | |
|---|---|
| toluene | 1,4-di-n-propylbenxzene |
| xylenes | 1,4-dimethyl-3-isopropylbenzene |
| 1,2,3-trimethylbenzene | 1-ethyl-2,5-di-n-propylbenzene |
| 1,2,4-trimethylbenzene | tert-butylbenzene |
| 1,3,5-trimethylbenzene | n-butylbenzene |
| 1,2,4,5-tetramethylbenzene | 1,3-di-n-butylbenzene |
| 1-methyl-2-ethylbenzene | n-amylbenzene |
| 2,4-diethylbenzene | 1-(n-amyl)-2-isopropylbenzene |
| ethylbenzene | 1,2-dimethyl-4-(n-hexyl)benzene |
| isopropylbenzene | n-octylbenzene |

Toluene is the presently preferred solvent and contributes, upon chain transfer reaction with the butadiene polymer, a benzylic anion initiator capable of initiating the polymerization of new butadiene polymers.

If an organolithium initiator is employed alone in a hydrocarbon solvent linear polymers will be produced. These linear polymers yield on hydrogenation a product possessing poor lubricating utility. The concurrent use of complexing agents (such as certain tertiary amines, soluble salts of the heavier alkyl metals, polyamines, polyethers, crown ethers, etc.) or certain oxygen-containing solvents (such as tetrahydrofuran and 1,2-dimethoxyethane) encourages the 1,2 linkage mode and thus yields branched polymers suited for the purposes of my invention. N,N,N',N'-tetramethylethylenediamine (TMEDA) and potassium tert-amyloxide (KTA) are complexing agents that I have used.

I have found that the pour point of a hydrogenated 1,3-butadiene polymer decreases with increased ethyl branching. In other words the more extensive the 1,2 addition mode during polymerization the lower the pour point of the resultant polymer.

The hydrogenated 1,3-butadiene polymers of my invention are those polymers formed during a polymerization process in which at least about 60% of the addition steps are of the 1,2 addition mode. In other words at least about 60% of the main polymer chain has the 1,2 addition structure. These hydrogenated polymers having a molecular weight within the range of about 150–3,000 and preferably within the range of about 280–600 possess pour points low enough to be used as synthetic lubricants.

The scope of my invention includes the use of a mixture of polymers characterized by an average of at least about 60% of the 1,2 addition structure and by an average molecular weight within the range of about 150 to about 3,000 and preferably within the range of about 280 to about 600.

Any polymerization and hydrogenation process that yields these hydrogenated polymers can be used. Many such methods are well known in the art and are suitable for the purposes of this invention. My invention is not limited to any particular polymerization or hydrogenation process nor to any initiator, solvent, complexing agent or reaction condition. U.S. Pat. No. 4,268,705, incorporated by reference herein, teaches one acceptable method.

Broadly, the scope of this invention encompasses polymers (including mixtures of polymers) defined by the formula

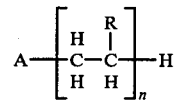

where A is a negative ion such as, for example, $CH_3(CH_2)_3$— or

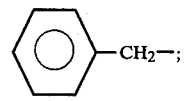

n is a whole number greater than 2; and each R in each

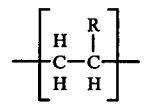

group is independently selected from H and $CH_3CH_2$— such that at least about 60% of the R's in the above-defined polymer are $CH_3CH_2$—. The polymer has an average molecular weight within the range of about 150 or about 3,000 and preferably within the range of about 280 to about 600.

The method of my invention is practiced by utilizing the synthetic lubricant of my invention in any application in which any petroleum or other synthetic lubricant is employed. This includes positioning my synthetic lubricant between two surfaces (at least one of which is movable with respect to the other) to reduce the friction between the surfaces. The phrase "positioning ... between two surfaces" is intended in this disclosure and in the claims to mean, among other things, causing or allowing my synthetic lubricant to come between two surfaces. The surfaces can be of any shape, size or material such that, upon application of my synthetic lubricant, friction between the surfaces is reduced or another advantage associated with petroleum or other synthetic lubricants is at least partially achieved.

It is contemplated that any of the conventional lubrication additives employed in petroleum or other synthetic lubricants will similarly be of use in my synthetic lubricant. Examples of such additives include oxidation inhibitors, rust inhibitors, antiwear agents, foam inhibitors, detergents and dispersants as well as pour point depressants and viscosity index improvers.

EXPERIMENTAL WORK

My experimental work focused on the polymerization of 1,3-butadiene monomers and the suitability of the resultant polymers, upon hydrogenation, as synthetic lubricants. To present the currently contemplated best mode of operation of my invention and to otherwise aid in the disclosure of my invention a portion of my experimental work is described herein.

Chemistry

The following is a further elaboration of the chemistry relevant to the methods I employed to prepare butadiene polymers suitable for the purposes of this invention. It should be kept in mind that other methods of preparation known to those of skill in the art are also useful though not described fully herein.

N-butyllithium was used to initiate the polymerization. If the n-butyllithium is employed alone in a hydrocarbon solvent linear polymers will be produced which are unsatisfactory for the purposes of my invention. The 1,2 addition mode, and thus branching, can be encouraged by the concurrent use of a complexing agent (such as certain tertiary amines, soluble salts of the heavier alkyl metals, polyamines, polyethers, crown ethers, etc.) or certain oxygen-containing solvents (such as tetrahydrofuran and 1,2-dimethoxyethane). N,N,N',N'-tetramethylethylenediamine (TMEDA) and potassium tert-amyloxide (KTA) were used as complexing agents in my experiments.

The polymerization was carried out in the presence of a toluene solvent, an n-butyllithium initiator and TMEDA and/or KTA. Both TMEDA and KTA promote chain transfer (i.e. transmetallation) from the living polymer to toluene to form the benzylic anion as shown in equation V.

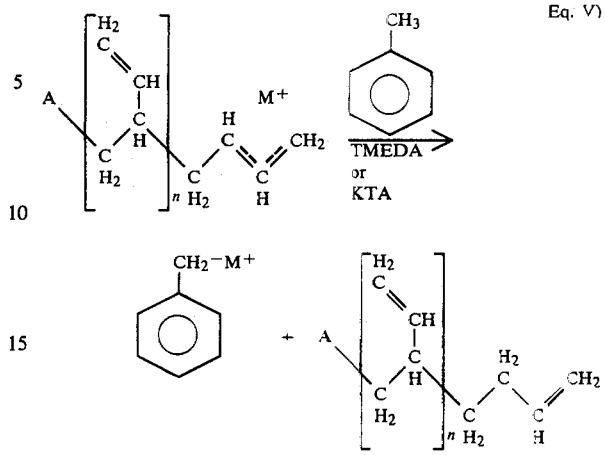

Although creation of the benzylic anion signals the termination of the polymer the benzylic anion is capable of initiating the polymerization of another butadiene polymer. This suggests the further addition of butadiene monomer after the initial charge has been consumed to produce a second generation of butadiene polymers having an average molecular weight substantially identical to that of the first generation. The procedure can be repeated numerous times to produce large amounts of the desired polymer. This incremental addition strategy was employed in my experimental work.

The process begins with the n-butyllithium initiation of butadiene to form the first generation of butadiene polymers. With the production of the benzylic anion upon chain transfer (transmetallation) a telomerization process is primed and ready to produce more polymer with each incremental addition of butadiene monomer.

The overall incremental addition process can best be described by reference to equation VI:

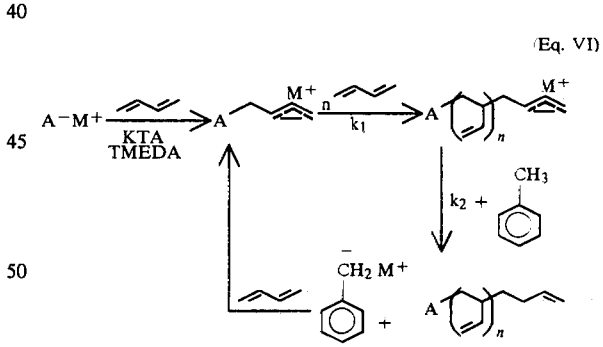

wherein A is $CH_3(CH_2)_3^-$ or

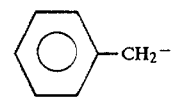

and n is a whole number.

The ionic telomerization is a process in which the telogen (toluene) reacts with the taxogen (butadiene) to initiate the formation of the telomer (product oligomer). The rate constant of the polymerization reaction is represented by $k_1$. The rate constant of the chain transfer (transmetallation) reaction is represented by $k_2$. In order to obtain the desired narrow distribution of molecular weight in the product the rate constant $k_1$ must be much greater than the rate constant $k_2$ such that the polymerization reactions are completed before claim transfer has occurred to a significant degree. Because the energy of activation is higher for chain transfer than for polymerization this relationship between the rate constants can be achieved by carrying out the process at a low temperature.

The sequence of events is as follows: (1) polymerization (with nearly no chain transfer); (2) chain transfer (after completion of the polymerization); (3) addition of another increment of butadiene as rapidly as possible with good mixing to attain homogeneous conditions; and (4) repetition of steps (1), (2) and (3) as many times as desired. If the temperature is too high chain transfer will be encouraged during step (1) and its deleterious effect (i.e. premature termination of growing polymer) will adversely affect the products average molecular weight. If the temperature is too low chain transfer will proceed so slowly during step (2) that the entire process will become impracticable due to the excessive time required between successive incremental additions of butadiene. For a given combination of reactants and process parameters the resultant average molecular weight of the polymer product can be manipulated by varying the temperature. One of ordinary skill can, with this disclosure in hand, readily determine a satisfactory temperature.

To obtain the desired narrow molecular weight distribution (preferably about 280 to about 600) several conditions should be satisfied: (1) all of the initiating species should be present and active at the onset of the reaction; (2) the rate constant of the initiation and of each consecutive addition should be equal and not dependent upon the size of the growing polymer; (3) a uniform temperature and spatial monomer concentration should be maintained during the polymerization; and (4) termination or chain transfer must not be allowed to occur beyond an insignificant degree during the polymerization.

As is apparent from equation VI those polymers initiated by a benzylic anion will possess an aromatic tail (see A) while those initiated by the n-butyl anion will possess an n-butyl tail (see A).

Materials

The polymerization performed in beverage bottles were carried out with cyclohexane (Phillips Marlex ®) grade) and toluene (Phillips pure grade) which had been dried by countercurrent nitrogen flow and dispensed under nitrogen atmosphere. The butadiene (Phillips rubber grade) used in beverage bottles was dried by passage in vapor phase over activated alumina at 50° C. and stored at −10° C.

The n-butyllithium (n-BuLi), N,N,N'N'-tetramethylethylenediamine (TMEDA), and naphthalene were from Aldrich Chemical Company. The potassium metal, 5% palladium on carbon, and 5% platinum on carbon were products of the Alfa Division of Ventron Corporation. Fisher Scientific Company provided the tert-amyl alcohol and sodium metal. Matheson, Coleman and Bell provided the tetrahydrofuran. The reagents were stored in 26 or 10 oz. beverage bottles capped with Crown caps and self-sealing liners except for the monomers which were stored in steel cylinders.

The potassium tert-amyloxide (KTA) was prepared by heating an excess of tert-amyl alcohol with potassium metal followed by removal of the excessive alcohol under vacuum. A measured amount of KTA was dissolved in a suitable solvent in a pop bottle with a trace of potassium metal. An aliquot was titrated with 0.1 M hydrochloric acid (Fixanal) to a colorless end point using phenolphthalien as an indicator.

The molarity of the n-butyllithium was determined by titration of diphenylacetic acid from Aldrich Chemical Company to a yellow end point. This procedure was done in tetrahydrofuran with and without KTA and TMEDA to assure all reagents were dry. The TMEDA solution and tetrahydrofuran were stored over 4 Å molecular sieves from Davison Chemical Division of W. R. Grace and Company.

The sodium naphthalide was prepared in tetrahydrofuran by allowing sodium metal to react with an equimolar amount of naphthalene overnight to give a dark green solution. The butadiene was then added directly to the beverage bottle containing the sodium naphthalide solution. The styrene and octene were from Aldrich Chemical Company and the isoprene was from Eastman Organic Chemicals. The inhibitor in these monomers as well as in Phillips rubber grade butadiene used in the autoclave runs was removed just before use by Kaiser A-201 alumina. Activation of the alumina and molecular sieves was carried out at 300 C for 8 hours under vacuum.

The toluene and xylenes from Mallinckrodt, Inc. were distilled from calcium hydride (Alfa) into beverage bottles containing 4 Å molecular sieves. These were used for oligomerizations in the autoclaves. The hexane used was Phillips pure grade hydrocarbon, and the 10% acetic acid was prepared from glacial acetic acid supplied by E. I. duPont de Numours and Company. The magnesium sulfate (anhydrous) was a product of Mallinckrodt, Inc.

Apparatus

Hypodermic syringes were used to add reagents to beverage bottles. The butadiene was dispensed through a needle into the capped bottles in the liquid phase from a calibrated cylinder under nitrogen pressure. Hydrogenations were performed in a shaker bottle at low pressure using a Parr Hydrogenator or at high pressure in autoclaves.

The high pressure stainless steel autoclaves were located within steel barricades. The 300 ml and 1 liter autoclaves were from Autoclave Engineers, Inc. Each of the autoclaves had an internal cooling coil, a variable speed magnetically driven agitator, an external heating jacket, an induction tube which led to the bottom of the autoclave, and numerous ports at the top of the autoclave. They were equipped with rupture disks, the housings of which were vented to an outside stack via flexible stainless steel tubing. Stainless steel cylinders from 65 ml of 2.5 liters were used to weigh and introduce the necessary quantities of n-butyllithium, butadiene, and other reagents into the pressurized autoclaves.

Procedure

The beverage bottles were dried in an oven at 110 C for at least 2 hours prior to removal and corking with rubber stoppers. After cooling, the bottles were flushed with nitrogen, filled with solvent (which had also been degassed with nitrogen) and then capped. The charge order was: butadiene, complexing agent or agents (KTA, TMEDA, etc), and n-butyllithium, and then additional butadiene was added via hypodermic syringes for more increments if desired. The bottles were placed in the appropriate temperature water bath and tumbled for complete mixing. The active polymer solution was quenched with 10% aqueous acetic acid and washed with water before drying the organic layer over MgSO$_4$. The drying agent was removed by gravity filtration and most of the solvent was removed on a rotary evaporator.

Hydrogenations were performed on these small samples in the Parr hydrogenator with the heterogeneous palladium or platinum catalysts at 20 to 60 psi of hydrogen at 30° to 80° C. until no more hydrogen was consumed (20 to 40 hours). Several samples were hydrogenated with a homogeneous nickel catalyst prepared by adding triethylaluminum (from Alfa) to nickel octoate (from K&K Laboratories) at a 2 to 1 mole ratio respectively. After addition of this catalyst, 50 psi of hydrogen was maintained during a hydrogenation period of 2 to 4 hours at 50° C. The reaction was quenched with saturated ammonium phosphate dibasic solution and air was bubbled through the bottle for 3 hours at 50° C. The solution was filtered to remove the precipitated catalyst as were the samples hydrogenated with the heterogeneous catalyst.

Initial experiments with the 300 ml and 1 liter autoclave were performed using the following procedure. The reactor heads were removed after each run and, after cleanup, the sealed autoclave was purged with nitrogen. The solvent and complexing agent(s) were added under a nitrogen blanket and the autoclave was closed. A vacuum was pulled on the autoclave followed by a nitrogen flush which was repeated three times. The butadiene was then added from a small weighed cylinder into the evacuated autoclave and a slight (10 to 20 psi) pressure of nitrogen gas was introduced. After reaching operating temperature with stirring, the n-butyllithium solution was added through the induction tube from a small cylinder containing 50 to 80 psi of nitrogen. The pressure on the cylinder depended on the reactor pressure with at least 30 psi difference. If desired, after predetermined intervals of time, additional increments of butadiene were added through the induction tube from a small cylinder under nitrogen pressure. A 2° to 10° C. temperature rise occurred 0.5 to 4 minutes after addition of the b-butyllithium and after each increment of butadiene, with an initial pressure rise of 0.5 to 10 psi followed by a slow drop in pressure. Thermoelectric temperature controllers provided with load-limiting powerstats and an independent override cut-off were used to control the temperature. Cooling water was used for temperature control only when the temperature to be maintained was in the range of 30° to 40° C.

After the reaction was finished, the active polymer solution was pressurized out of the autoclave through the induction tube into a 10% aqueous acetic acid solution. The autoclave was flushed with 150 to 200 ml of hexane which was combined with the product. The aqueous layer was separated and the organic layer was washed with 10% aqueous acetic acid and twice with water before drying over magnesium sulfate. Filtration of the drying agent followed by removal of most of the solvents on the rotary evaporator resulted in a yellow to colorless solution of oligomers.

Analysis of the unhydrogenated oligomers were performed on a Water Associates liquid chromatograph using gel permeation chromatography columns (two 30 by 0.78 cm 500 Å $\mu$-styragel columns followed by two 30 by 0.78 cm 100 Å $\mu$-styragel columns). Chloroform at 0.7 ml/min flow rate was the solvent and both the refractive index (8×) and untraviolet (0.5 to 1.0 AUFS at 254 nm) detectors were used. The samples (5 to 25 $\mu$l) were filtered through a 0.4 micron filter before injecting into columns. Samples of linear alkanes at 4 carbon intervals up to C$_{44}$ were used as standards. This procedure provided a fairly reliable method to determine the molecular weight range of products.

In later experiments, a pump was used to deliver the increments of butadiene at specific intervals. A Lapp LS-30 pump was used on the 1 liter autoclave. The butadiene was dried as described previously and transferred to a gallon cylinder. A tube extending to the bottom of the cylinder was used to draw off the butadiene into another dryer containing alumina and then through a filter ahead of the pump. After the pump, a back pressure valve (set at 100 to 110 psi) and check valve were used prior to introduction of the butadiene into the autoclave via the induction tube. The butadiene was stored at 10° to 0° C. since the first alumina column removed most of the inhibitor. 70 psi of nitrogen was maintained on the cylinder in use to insure delivery of liquid butadiene. The pump was set at maximum stroke to deliver the desired amount of butadiene in the least amount of time. The pump was calibrated by pumping butadiene into a tared small cylinder containing about 50 psi of nitrogen (approximate autoclave pressure although the back pressure valve maintained a constant pressure on the delivery side of the pump). The pump was controlled by a Flexopulse timer which allowed the changing of pumping time and the length of intervals between the successive increments of butadiene.

After addition of n-butyllithium, the autoclave pressure was raised to 50 psi. In a typical run in the 1 liter autoclave, after an initial temperature rise of 3° to 5° C. with addition of n-butyllithium, 1° to 3° C. was the observed rise in temperature with each increment of butadiene. The pressure rose 0.5 to 1 psi with each increment but then dropped for a total rise of 10 to 20 psi for 45 increments of butadiene.

The hydrogenations were performed in the 300 ml or 1 liter autoclave depending upon the amount of material. The polymers, 50 to 200 ml of hexane, and 0.4 to 0.6 g of 5% palladium or platinum on carbon were added to the autoclave which was closed, evacuated, and filled with hydrogen. While heating to operating temperature (160° C.) the exothermic hydrogenation began. This was controlled with cooling water. After 2 hours at operating temperature and pressure (450 psi), the autoclave was cooled and the material withdrawn before flushing the autoclave with hexane. The combined material was filtered and concentrated on the rotary evaporator before distilling. After distillation, a finish hydrogenation was done under similar conditions except the pressure was raised to 750 psi.

The hydrogenated polymers were distilled in a single distillation apparatus or through a short vacuum-jacketed Vigreux column (~3 theoretical plates). The product was cut into a light fraction (usually about 220°–380° C. corrected to 760 torr), a lube oil fraction (usually about 380°–550° C. corrected to 760 torr) and a residue or heavy fraction (usually greater than about 550° C. corrected to 760 torr). In some samples a rise in pressure (0.07 torr to 1–2 torr) was observed during distillation of the last portion of lube oil. Every attempt was made to minimize this behavior by longer hydrogenations and lower kettle temperatures.

Analysis of the fractions was done on Hewlett-Packard 5840A gas chromatograph using dual Dexsil 300 columns ($\frac{1}{8}'' \times 36''$) at 50° C. for 3 minutes and then programmed 15° C./minute to 375° C. for 45 minutes. Linear alkanes at 4 carbon intervals to $C_{44}$ were used as references. Infra Red (IR) and proton Nuclear Magnetic Resonance ($^1$H NMR) spectra were also obtained on the samples after the finish hydrogenation. The number of methyl groups per monomer was estimated from the integration of $^1$H NMR using the following formula:

$$\frac{\text{methyl groups}}{\text{monomer}} \approx \frac{A}{3} \div \left( \frac{A}{3} + \frac{B + C - 5/3\,A}{8} \right)$$

wherein A=methyl protons, B=methylene protons and C=methine protons. The equation reduces to:

$$\frac{\text{methyl groups}}{\text{monomer}} \approx 8A \div 3\,(A + B + C) \qquad \text{(Eq. VII)}$$

For purposes of illustration consider the following hydrogenated 1,3-butadiene polymers. Note that A is represented by the benzylic anion

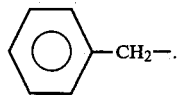

percentage of 1,2 addition structure in each polymer of the polymer mixture.

The number of aromatic units per molecule (assumed to be a $C_{32}$ polymer) was also estimated from the integration of $^1$H NMR using the following formula:

$$\frac{\text{aromatic groups}}{\text{molecule}} = \left( \frac{\text{aromatic protons}}{5} \right) (8) \div$$

$$\left( \frac{\text{alkane protons}}{8} \right) \text{ or}$$

$$= 64\,(\text{aromatic protons}) \div 5\,(\text{alkane protons})$$

Tables I, II and III present the experimental data. The tables show the reaction conditions, reagents and selectivity for each sample. A fractionated cut of each hydrogenated sample was taken at the indicated boiling range and analyzed to determine viscosity, viscosity index and pour point. Aromatic group/molecule and methyl group/monomer ratios were also calculated. Table IV presents the gas chromatograph results (i.e. composition by wt %) obtained at 4 carbon intervals for most of the samples.

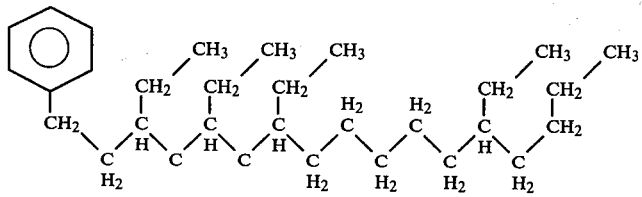

(Eq. VIII)

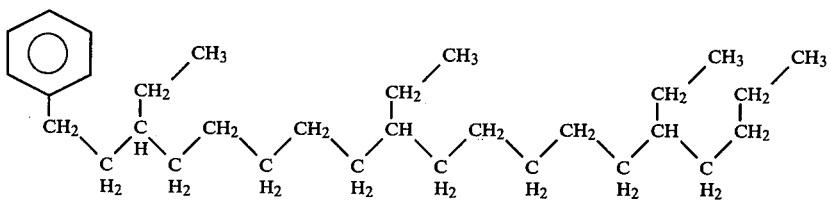

(Eq. IX)

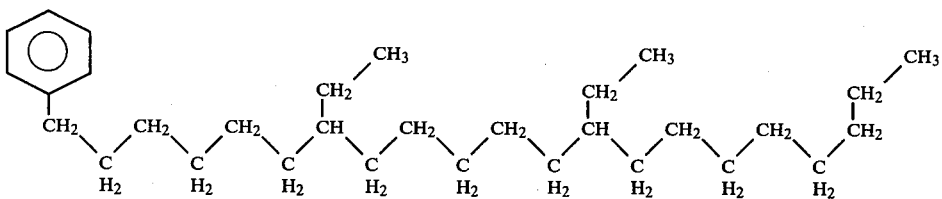

(Eq. X)

Using equation VII the ratios are calculated to be 0.78/1, 0.63/1 and 0.47/1 corresponding to VIII, IX and X respectively. These ratios estimate the extent to which the 1,2 addition mode occurred during polymerization.

In my experimental work mixtures of polymers were produced and thus the calculated methyl group to monomer ratio for each sample represents an average. This average represents in turn an estimate of the average All samples were tested for pour point and viscosity index in accordance with the standard methods set forth by ASTM D97 and ASTM D2270 respectively.

Batch Oligomerization (Table I)

Initially, butadiene was oligomerized by a batch polymerization using n-butyllithium (n-BuLi) as the initiator and potassium tert-amyloxide (KTA) as the chain transfer agent (see samples A, B, C and D in Table I). Good yields of lube oils with excellent viscosity indices were obtained but the pour points were much higher than desired. Reaction temperature had a minor effect upon the lube oil properties.

Oligomerization under identical conditions, except with N,N,N',N'-tetramethylethylenediamine (TMEDA) instead of KTA, resulted in a better yield of lube oil with a lower pour point (see sample E in Table I). The viscosity index was also lower. This synthetic lube oil was more branched (as determined by the methyl group/monomer ratio) than the samples prepared with KTA.

When sodium naphthalide was used as the initiator instead of n-butyllithium even more highly branched oligomers were obtained (see samples F and G in Table I). These oligomers had lower viscosity indices and low pour points. The lube oil properties could have been affected by some naphthalene left in the lube oil fraction.

Incremental Oligomerization (Table II)

Butadiene oligomers were prepared using up to 14 incremental additions of butadiene monomer. The methyl group/monomer ratio was greater than 0.6 to 1 and the pour points were below $-30°$ C. for all of the samples tested (see Table II).

Note that as the reaction temperature was decreased the average molecular weight increased, since chain transfer was not complete (Equation VII) and further growth of the living oligomers occurred. But addition of more complexing agents (TMEDA or THF) at these lower temperatures did result in oligomers in the lube oil molecular weight range. Thus the desired chain transfer (trans-metallation) is dependent upon temperature, and the nature and amount of chain transfer agents.

In one run (sample R) xylenes were used as the telogen instead of toluene in the anionic telomerization of butadiene. The synthetic lubricant produced thereby had properties similar to those from toluene. Probably only the meta and ortho xylenes reacted since the equilibrium acidity is greater for these isomers. Other aromatics could also be used as telogens in the anionic telomerization.

Incremental Oligomerization (Table III)

The anionic telomerization was developed to the point where 30 to 60 increments of butadiene were added via a pump to give 70 to 90% of the polymers in the lube oil range (about $C_{24}$ to $C_{40}$). The work outlined in Table III was directed towards achieving the desired low pour point and a high viscosity index. By comparison of samples DD and EE it is obvious that KTA resulted in more linear oligomers than TMEDA. KTA is more effective in promoting chain transfer since the high yield of low molecular weight oligomers indicated chain transfer occurring during oligomerization of each increment of butadiene. A combination of these two agents resulted in synthetic oil production of greater than 90% with a pour point of $-40°$ C. and viscosity index of 105 (see sample JJ).

TABLE I

| BATCH ANIONIC OLIGOMERIZATION OF BUTADIENE | | | | | | |
|---|---|---|---|---|---|---|
| Sample | A | B | C | D | E | F |
| Conditions | | | | | | |
| Reactor | bottles | bottles | bottles | bottles | bottles | bottles |
| Temperature (°C.) | 70 | 70 | 70 | 50 | 50 | 50 |
| Time (hrs) | 2 | 2 | 2 | 2 | 2 | 2 |
| Reagents | | | | | | |
| Hexanes (ml)[a] | 80 | 175 | 235 | 150 | 40 | — |
| Toluene (ml) | 390 | 390 | 390 | 390 | 480 | — |
| Tetrahydrofuran (ml) | — | — | — | 12.2 | — | 170 |
| Butadiene (m moles) | 556 | 556 | 556 | 556 | 556 | 374 |
| n-Butyllithium (m moles) | 75 | 82.5 | 75 | 82.5 | 82.5 | — |
| Potassium tert-amyloxide (m moles) | 25 | 25 | 35 | 25 | — | — |
| N,N,N',N'—TMEDA* (m Moles) | — | — | — | 13 | 165 | — |
| Sodium naphthalide (m moles) | — | — | — | — | — | 65 |
| BD/n-BuLi/KTA/TMEDA (mole ratio) | 7.4/1/0.30/0 | 6.74/1/0.30/0 | 7.4/1/0.47/0 | 6.74/1/0.42/0 | 6.74/1/0/2 | 3.48/1/0/0[d] |
| Selectivity (Based on butadiene used) | | | | | | |
| Lights ($C_{12}$-$C_{20}$)[b] | 11.0 | 16.8 | 9.5 | 15.2 | 12.3 | 10.3 |
| Lube Oil ($C_{24}$-$C_{40}$) | 72.9 | 63.0 | 71.5 | 69.8 | 83.6 | 18.4 |
| Heavies (>$C_{40}$) | 12.9 | 20.0 | 13.0 | 18.6 | 6.1 | 1.6 |
| Properties of Lube Oil | | | | | | |
| Boiling range (°C.) | 380°–550° | 380°–540° | 374°–549° | 380°–555° | 378°–555° | 372°–555° |
| Yield (% of product) | 75.3 | 65.6 | 76.1 | 67.3 | 82.0 | 19.6 |
| Viscosity (SUS @ 100 F.) | 132.1 | 115.9 | 153.8 | 105.8 | 128.7 | 60 |
| Viscosity (SUS @ 210 F.) | 43.4 | 42.2 | 45.6 | 41.2 | 41.4 | 43.5 |
| Viscosity Index | 140 | 138 | 138 | 135 | 91 | 41 |
| Pour Point (°C.) | 1.7 | 10 | −3.9 | 4.4 | <−48.3 | −40 |
| Aromatic Unit/molecule ($C_{32}$) | .187 | .131 | .295 | .208 | .037 | .0645 |
| Methyl group/monomer | .668 | .609 | .647 | .632 | .746 | .174 |
| % Vinyl (1,2-addition)[c] | 44.9 | 38.7 | 44.2 | 35.7 | 52.8 | |

| Sample | G | H[1] | H[2] | H[3] |
|---|---|---|---|---|
| Conditions | | | | |
| Reactor | bottles | 300 ml autoclave | 300 ml autoclave | 300 ml autoclave |
| Temperature (°C.) | 50 | 110 | 110 | 125 |
| Time (hrs) | 3 | .75 | 1.25 | 1.5 |
| Reagents | Hexanes (ml)[a] | — | 45 | 50 | 60 |
| Toluene (ml) | — | 100 | 90 | 30 |
| Tetrahydrofuran (ml) | 560 | — | — | — |
| Butadiene (m moles) | 556 | 209 | 194 & 191 | 206 & 186 & 190[f] |

TABLE I-continued

| BATCH ANIONIC OLIGOMERIZATION OF BUTADIENE | | | | |
|---|---|---|---|---|
| n-Butyllithium (m moles) | — | 13.8 | 20 | 34.8 |
| Potassium tert-amyloxide (m moles) | — | 12 | 12 | 17.6 |
| N,N,N',N'—TMEDA* (m moles) | — | — | — | — |
| Sodium naphthalide (m moles) | 166 | | | |
| BD/n-BuLi/KTA/TMEDA (mole ratio) | 3.35/1/0/0/[d] | 15.4/1/1.15/0 | 19.25/1/.6/0 | 16.7/1/.51/0 |
| Selectivity (Based on butadiene used) | | | | |
| Lights ($C_{12}$-$C_{20}$)[b] | 20.3 | | 32.2[g] | |
| Lube Oil ($C_{24}$-$C_{40}$) | 60.4 | | 65.4 | |
| Heavies (>$C_{40}$) | 1.6 | | 5.98 | |
| Properties of Lube Oil | | | | |
| Boiling range (°C.) | 378°–510° | | 370°–490° | |
| Yield (% of product) | 73.4 | | 63.1 | |
| Viscosity (SUS @ 100 F.) | 189.9 | | 99.9 | |
| Viscosity (SUS @ 210 F.) | 44.8 | | 40.1 | |
| Viscosity Index | 83 | | 122 | |
| Pour Point (°C.) | −45.6 | | 10 | |
| Aromatic Unit/molecule ($C_{32}$) | .240 | | .951 | |
| Methyl group/monomer | .867 | | .537 | |
| % Vinyl (1,2-addition)[c] | | | | |

Notes:
BD = butadiene;
n-Bu = n-butyllithium;
KTA = potassium tert-amyloxide;
TMEDA = N,N,N',N'—tetramethylethylene diamine
[a]Includes cyclohexane and n-hexane.
[b]Obtained from distillation; some lights ($C_{11}$) could have been in trap.
[c]From IR of unhydrogenated oligomers - aromatics interfere with determination.
[d]Mole ratio of Na (naphthalide), not n-BuLi.
[e]Butadiene added in two batches (increments).
[f]Butadiene added in three batches (increments).
[g]Data from combination of samples $H^1$, $H^2$ and $H^3$ and labelled H.
*Tetramethylethylene diamine

TABLE II

| ANIONIC TELOMERIZATION OF BUTADIENE WITH TOLUENE BY INCREMENTAL ADDITION | | | | | |
|---|---|---|---|---|---|
| Sample | I | J | K[a] | L[g] | M |
| Conditions | | | | | |
| Reactor | 300 ml autoclave | 300 ml autoclave | 300 ml autoclave | | 300 ml autoclave |
| Temperature (°C.) | 110 | 110 | 100 | | 110 |
| Duration of Increments (sec) | ~10 | ~10 | ~10 | | ~10 |
| Interval between Increments (min) | ~22[e] | ~28[e] | ~9[e] | | ~13 |
| No. of Increments | 5 | 5 | 9 | | 14 |
| Reagents | | | | | |
| Hexanes (ml)[m] | 30 | 30 | 7 | | 5 |
| Toluene (ml) | 90 | 90 | 120 | | 120 |
| Butadiene per Increment (m moles) | 192.6[e] | 199.2[f] | 111.5[e] | | 92.7 |
| n-Butyllithium (m moles) | 25.2 | 25.2 | 13.9 | | 11.6 |
| Potassium tert-amyloxide (m moles) | — | — | — | | — |
| N,N,N',N'—TMEDA* (m Moles) | 25.2 | 25.2 | 13.9 | | 11.6 |
| BD/n-BuLi/KTA/TMEDA (mole ratio)[b] | 7.64/1/0/1 | 7.90/1/0/1 | 8.02/1/0/1 | | 7.99/1/0/1 |
| Selectivity (Based on butadiene used) | | | | | |
| Lights ($C_{12}$-$C_{20}$)[c] | 19.5 | 19.1 | 26.9 | | 18.9 |
| Lube Oil ($C_{24}$-$C_{40}$) | 78.6 | 71.6 | 72.4 | | 75.8 |
| Heavies (>$C_{40}$) | 5.56 | 11.7 | 5.1 | | 9.5 |
| Properties of Lube Oil | | | | | |
| Boiling range (°C.) | 370°–485° | 370°–529° | 385°–483° | | 392°–535° |
| Yield (% of product) | 75.8 | 69.9 | 69.8 | | 72.7 |
| Viscosity (SUS @ 100 F.) | 252 | 375 | 207 | 341 | 153.7 |
| Viscosity (SUS @ 210 F.) | 48.2 | 53.9 | 46 | 53.3 | 43.1 |
| Viscosity Index | 81 | 81 | 89 | 87 | 93 |
| Pour Point (°C.) | −34.4 | −31.7 | −34.4 | −31.7 | −34.4 |
| Aromatic Unit/molecule ($C_{32}$) | .809 | .785 | .831 | .573 | .919 |
| Methyl group/monomer | .645 | .662 | .681 | .671 | .698 |

| Sample | N | O | P | Q | R | S |
|---|---|---|---|---|---|---|
| Conditions | | | | | | |
| Reactor | bottles | bottles | bottles | 300 ml autoclave | 300 ml autoclave | |
| Temperature (°C.) | 50 | 70 | 70 | 90 | | |
| Duration of Increments (sec) | ~25 | ~25 | ~25 | | ~10 | ~10 |
| Interval between Increments (min) | 20 | 22 | 22 | 15 | 15 | |
| No. of Increments | 12[h] | 12[h] | 12[h] | 12 | 12 | |
| Reagents | | | | | | |
| Hexanes (ml)[m] | 7 | 7 | 7 | 7 | 7 | |
| Toluene (ml) | 230 | 200 | 220 | 120 | 120 xylenes[k] | |
| Butadiene per Increment (m moles) | 92.5 | 92.5 | 92.5 | 93.8 | 92.0 | |
| n-Butyllithium (m moles) | 15.4 | 15.4 | 15.4 | 15.4 | 15.4 | |

TABLE II-continued

ANIONIC TELOMERIZATION OF BUTADIENE WITH TOLUENE BY INCREMENTAL ADDITION

| | | | | | |
|---|---|---|---|---|---|
| Potassium tert-amyloxide (m moles) | — | 370 THF[i] | — | — | — |
| N,N,N',N'—TMEDA* (m Moles) | 30.8 | 15.4 | 30.8 | 30.8 | 30.8 |
| BD/n-BuLi/KTA/TMEDA (mole ratio)[b] | 6.01/1/0/2 | 6.01/1/0/1 | 6.09/1/0/2 | 5.98/1/0/2 | |
| Selectivity (Based on butadiene used) | | | | | |
| Lights ($C_{12}$–$C_{20}$)[c] | 4.95 | 6.16 | 6.75 | 11.2 | 18.4 |
| Lube Oil ($C_{24}$–$C_{40}$) | 88.0 | 89.4 | 85.8 | 56.7[j] | 79.2 |
| Heavies (>$C_{40}$) | 5.4 | 5.2 | 7.64 | 4.3 | 2.52 |
| Properties of Lube Oil | | | | | |
| Boiling range (°C.) | 392–540° | 381°–538° | 383°–544° | 381°–538° | 383°–515° |
| Yield (% of product) | 89.5 | 88.7 | 85.6 | 78.5 | 79.1 |
| Viscosity (SUS @ 100 F.) | 221 | 259 | 351 | 190 | 240 | 319 |
| Viscosity (SUS @ 210 F.) | 46.8 | 49.0 | 53.9 | 45.3 | 47.9 | 51.6 |
| Viscosity Index | 85 | 88 | 88 | 88 | 95 | 81 |
| Pour Point (°C.) | −45.6 | −40 | −37.2 | −45.6 | −40 | −40 |
| Aromatic Unit/molecule ($C_{32}$) | .424 | .581 | .584 | .690 | .595 | .546 |
| Methyl group/monomer | .846 | .788 | .767 | .697 | .680 | .779 |
| Retention time of maximum (min)[d] | 34.8[e] | 35.0[e] | 35.4[l] | 38.3[l] | 37.0[e] | |

Notes:
[a] Butadiene added from small cylinder into autoclave and hypodermic syringes into bottles.
[b] Mole ratio is for only one increment of butadiene.
[c] Obtained from distillation; some lights ($C_{11}$) could be in trap.
[d] The retention time of the maximum in the peak for the refractiveindex detector of the liquid chromatograph; 36.0—38.0 represents the retention time of unhydrogenated oligomers in lube oil range; shorter retention time denotes higher molecular weight.
[e] Average of the values.
[f] Average of five increments of butadiene with 1st increment of 13.10 grams decreasing to 8.44 grams for last increment.
[g] Identical to sample J except a finish hydrogenation was done. Allprevious and subsequent samples did not have a finish hydrogenation.
[h] Each increment also contained ~8 ml of toluene.
[i] Tetrahydrofuran was used instead of potassium tert-amyloxide.
[j] Some material was lost during removal from autoclave.
[k] A mixture of xylenes was used instead of toluene.
[l] The leaking UGK injector was repaired which resulted in a slight change in retention times of 0.5 to 1 minute.
[m] Includes cyclohexane and n-hexane.
[n] Identical to sample R except a finish hydrogenation was done.
*Tetramethylethylene diamine

TABLE III

ANIONIC TELOMERIZATION OF BUTADIENE WITH TOLUENE IN 1 LITER AUTOCLAVE

| Sample | AA | BB[d] | CC[d] | DD[d] | EE[f] | FF[d] |
|---|---|---|---|---|---|---|
| Conditions | | | | | | |
| Temperature (°C.) | 90 | 90 | 90 | 90 | 90 | 90 |
| Duration of Increments (sec) | 60 | 30 | 30 | 15 | 15 | 15 |
| Interval between Increments (min) | 12 | 10 | 5 | 3 | 3 | 3 |
| No. of Increments | 30 | 30 | 45 | 47 | 47 | 45 |
| Reagents | | | | | | |
| Hexanes (ml)[e] | 7 | 5 | 4 | 2 | 2 | 2 |
| Toluene (ml) | 350 | 300 | 300 | 300 | 290 | 280 |
| Butadiene per Increment (m moles) | 94.4 | 67.5 | 62.96 | 33.3 | 33.3 | 33.3 |
| Total butadiene (m moles) | 2.83 | 2.03 | 2.83 | 1.57 | 1.57 | 1.50 |
| n-Butyllithium (m moles) | 15.4 | 11.3 | 10.5 | 5.55 | 5.79 | 5.12 |
| Potassium tert-amyloxide (m moles) | — | — | — | — | 11.58 | 6.00 |
| N,N,N',N'—TMEDA* (m moles) | 30.8 | 22.6 | 21.0 | 11.1 | — | — |
| BD/n-BuLi/KTA/TMEDA (mole ratio)[a] | 6.13/1/0/2 | 5.97/1/0/2 | 6.00/1/0/2 | 6/1/0/2 | 5.75/1/2/0 | 6.50/1/1./7/0 |
| Selectivity (Based on butadiene used) | | | | | | |
| Lights ($C_{12}$–$C_{20}$)[b] | 7.63 | 5.84 | 10.2 | 1.67 | 30.2 | 46.5 |
| Lube Oil ($C_{24}$–$C_{40}$) | 53.7 | 56.3 | 109.9 | 96.7 | 68.8 | 76.7 |
| Heavies (>$C_{40}$) | 3.96 | 6.96 | 2.40 | 12.9 | — | 17.5 |
| Properties of Lube Oil | | | | | | |
| Boiling range (°C.) | 380°–522° | 380°–533° | 380°–530° | 387°–552° | >380 | 380°–550 |
| Yield (% of product) | 82.3 | 81.8 | 89.7 | 86.9 | 43.3 | 54.5 |
| Viscosity (SUS @ 100 F.) | 213 | 361 | 184 | 339 | 256 | 106.4 |
| Viscosity (SUS @ 210 F.) | 46.9 | 55.5 | 45.3 | 53.5 | 55.0 | 41.2 |
| Viscosity Index | 96 | 96 | 96 | 90 | 147 | 135 |
| Pour Point (°C.) | −42.8 | −37.2 | −40 | −40 | 15.6 | 6.7 |
| Aromatic Unit/molecule ($C_{32}$) | .624 | .328 | .397 | .241 | .551 | .411 |
| Methyl group/monomer | .707 | .783 | .789 | .811 | .475 | .536 |
| Retention time of maximum (min)[c] | 36.2 | 37.2 | 38.6 | 37.6 | 48.8 | 47.6 |

| Sample | GG[d] | HH[d] | II[d] | JJ[d] | KK[d] | LL[d] |
|---|---|---|---|---|---|---|
| Conditions | | | | | | |
| Temperature (°C.) | 80 | 80 | 90 | 60 | 60 | 65 |
| Duration of Increments (sec) | 15 | 15 | 15 | 15 | 15 | 15 |
| Interval between Increments (min) | 3 | 3 | 3 | 3 | 3 | 3 |
| No. of Increments | 45 | 45 | 60 | 45 | 45 | 60 |
| Reagents | | | | | | |
| Hexanes (ml)[e] | 2 | 2 | 3 | 3 | 3 | 3 |
| Toluene (ml) | 280 | 280 | 280 | 275 | 275 | 295 |
| Butadiene per Increment (m moles) | 33.3 | 33.3 | 33.3 | 33.3 | 33.3 | 33.3 |
| Total butadiene (m moles) | 1.50 | 1.50 | 2.00 | 1.50 | 1.50 | 2.00 |

TABLE III-continued

ANIONIC TELOMERIZATION OF BUTADIENE WITH TOLUENE IN 1 LITER AUTOCLAVE

| | | | | | | |
|---|---|---|---|---|---|---|
| n-Butyllithium (m moles) | 5.12 | 5.12 | 5.55 | 5.55 | 6.66 | 6.66 |
| Potassium tert-amyloxide (m moles) | 6.00 | 6.00 | .555 | 1.39 | 1.67 | 1.67 |
| N,N,N',N'—TMEDA* (m moles) | — | 370 THF[g] | 5.55 | 5.55 | 6.66 | 6.66 |
| BD/n-BuLi/KTA/TMEDA (mole ratio)[a] | 6.5/1/1.17/0 | 6.5/1/1.17/0 | 6/1/0.10/1 | 6/1/0.25/1 | 5/1/0.25/1 | 5/1/0.25/1 |
| Selectivity (Based on butadiene used) | | | | | | |
| Lights ($C_{12}$-$C_{20}$)[b] | 50.5 | 54.8 | 28.4 | 3.52 | 15.6 | 11.3 |
| Lube Oil ($C_{24}$-$C_{40}$) | 77.4 | 57.2 | 88.8 | 102.8 | 109.0 | 117.1 |
| Heavies (>$C_{40}$) | 9.47 | 15.4 | 15.6 | 5.34 | [h] | 2.46 |
| Properties of Lube Oil | | | | | | |
| Boiling range (°C.) | 380°–550 | 380°–540 | 380°–535° | 380°–525° | >380 | 380°–535 |
| Yield (% of product) | 56.4 | 44.9 | 66.9 | 92.1 | 87.5 | 89.5 |
| Viscosity (SUS @ 100 F) | 164.1 | 122.7 | 128.1 | 189.3 | 701 | 150.6 |
| Viscosity (SUS @ 210 F) | 46.7 | 42.5 | 42.4 | 46.7 | 90.2 | 44.4 |
| Viscosity Index | 141 | 129 | 113 | 105 | 135 | 116 |
| Pour Point (°C.) | 1.7 | ~15 | −20.6 | −40 | −37.2 | −28.9 |
| Aromatic Unit/molecule ($C_{32}$) | .127 | .206 | .339 | .155 | .164 | .247 |
| Methyl group/monomer | .545 | .590 | .731 | .790 | .766 | .652 |
| Retention time of maximum (min)[c] | 46.6 | 48.4 | 39.2 | 37.0 | 37.0 | 37.3 |

Notes:
[a] Mole ratio is for only one increment of butadiene.
[b] Obtained from distillation; some lights ($C_{11}$) could be in trap.
[c] The retention time of the maximum in the peak for the refractive index detector of the liquid chromatograph; 36.0–38.0 represents the retention time of unhydrogenated oligomers in lube oil range.
[d] A finish hydrogenation was done on this sample.
[e] Includes cyclohexane and n-hexane.
[g] Tetrahydrofuran was added as an additional complexing agent.
[h] The lube oil was not distilled so the heavy molecular weight material remained.

TABLE IV

GAS CHROMATOGRAPH RESULTS OF HYDROGENATED BUTADIENE OLIGOMERS
(Composition by wt %)

| Sample | A | B | C | D | E | F | G | H[1] | H[2] | H[3] |
|---|---|---|---|---|---|---|---|---|---|---|
| Total Oligomers | | | | | | | | | | |
| $C_8$ | — | — | — | — | .08 | 2.09 | .19 | 43.54 | 1.32 | 7.89 |
| $C_{12}$ | 1.90 | 3.28 | 3.25 | 3.27 | 3.77 | 10.02 | 12.30 | 18.33 | 5.37 | 21.93 |
| $C_{16}$ | 3.68 | 4.62 | 4.34 | 5.52 | 5.16 | 7.04 | 11.78 | 6.33 | 4.40 | 11.97 |
| $C_{20}$ | 2.39 | 8.20 | 6.42 | 9.27 | 12.23 | 7.21 | 19.39 | 6.39 | 9.24 | 10.28 |
| $C_{24}$ | 7.74 | 10.99 | 7.27 | 12.11 | 18.64 | 9.19 | 14.02 | 5.53 | 16.51 | 8.95 |
| $C_{28}$ | 12.44 | 12.87 | 10.00 | 16.47 | 23.13 | 11.39 | 15.08 | 4.91 | 19.20 | 9.03 |
| $C_{32}$ | 13.56 | 16.70 | 11.05 | 12.73 | 18.16 | 8.77 | 10.42 | 3.42 | 14.83 | 6.48 |
| $C_{36}$ | 19.94 | 13.85 | 12.49 | 11.33 | 8.36 | 11.49 | 9.09 | 3.86 | 15.3 | 7.31 |
| $C_{40}$ | 20.83 | 6.48 | 12.64 | 11.30 | 6.15 | 31.50[b] | 4.39 | 3.72 | 9.20 | 6.89 |
| $C_{44}$ | 12.33 | 3.02 | 13.46 | 17.98[b] | 6.1[b] | | 1.34 | 3.11[b] | 4.89[b] | 9.28[b] |
| >$C_{44}$ | — | 19.93 | 13.0 | | | | 1.95 | | | |
| Lube Oil | | | | | | | | | | |
| $C_{12}$ | | | 1.56 | 0.08 | 0.10 | 2.55[a] | 7.49[a] | | | |
| $C_{16}$ | 0.04 | — | 2.76 | 0.61 | 0.92 | 3.12[a] | 6.52[a] | | | |
| $C_{20}$ | 2.8 | 2.09 | 3.92 | 6.62 | 10.23 | 5.30 | 13.17 | | | |
| $C_{24}$ | 17.2 | 14.96 | 8.75 | 16.11 | 21.84 | 12.11 | 18.27 | | | |
| $C_{28}$ | 28.0 | 20.18 | 13.76 | 24.03 | 27.58 | 16.05 | 20.38 | | | |
| $C_{32}$ | 25.6 | 26.02 | 15.41 | 18.90 | 21.63 | 12.30 | 14.11 | | | |
| $C_{36}$ | | 21.78 | 17.39 | 16.38 | | 16.09 | 12.24 | | | |
| $C_{40}$ | 26.4[b] | 10.17 | 17.52 | 16.79 | 17.35[b] | 31.17[b] | 5.79 | | | |
| $C_{44}$ | | 4.74[b] | 18.83[b] | | | | 1.82 | | | |
| >$C_{44}$ | | | | | | | | | | |

| Sample | H | J | K | M | N | O | P | R | AA | BB |
|---|---|---|---|---|---|---|---|---|---|---|
| Total Oligomers | | | | | | | | | | |
| $C_8$ | | .055 | 0.19 | 0.22 | .30 | 0.28 | 0.03 | 0.18 | 0.21 | 0.07 |
| $C_{12}$ | | 8.39 | 11.20 | 10.38 | 3.45 | 2.83 | 2.04 | 2.66 | 3.32 | 1.95 |
| $C_{16}$ | | 9.53 | 11.30 | 11.15 | 7.49 | 7.28 | 4.57 | 13.48 | 9.03 | 9.21 |
| $C_{20}$ | | 10.21 | 12.46 | 12.48 | 8.06 | 7.38 | 4.26 | 8.79 | 6.63 | 6.78 |
| $C_{24}$ | | 9.97 | 11.88 | 11.49 | 10.74 | 11.18 | 8.79 | 10.68 | 9.67 | 9.77 |
| $C_{28}$ | | 11.74 | 12.94 | 11.99 | 10.37 | 9.60 | 10.40 | 9.97 | 8.88 | 9.55 |
| $C_{32}$ | | 8.99 | 9.21 | 8.88 | 10.33 | 10.51 | 12.04 | 10.99 | 10.06 | 7.91 |
| $C_{36}$ | | 9.95 | 10.11 | 9.98 | 9.68 | 9.75 | 11.62 | 9.96 | 8.99 | 8.23 |
| $C_{40}$ | | 8.79 | 8.33 | 8.09 | 10.61 | 10.62 | 11.59 | 10.03 | 9.50 | 7.68 |
| $C_{44}$ | | 8.69 | 7.38 | 6.25 | 28.98[b] | 31.33[b] | 32.45[b] | 23.37[b] | 33.55[b] | 31.03[b] |
| >$C_{44}$ | | 11.46 | 4.87 | 9.08 | | | | | | |
| Lube Oil | | | | | | | | | | |
| $C_{12}$ | 3.90 | 3.74(1.76) | 3.94[d] | 3.94 | 0.94 | 1.26 | 1.10 | 2.30(0.86)[d] | 3.10 | 2.06 |
| $C_{16}$ | 4.90 | 4.89(4.78) | 4.61 | 4.71 | 7.52 | 3.08 | 3.67 | 5.34(4.38) | 5.60 | 5.85 |
| $C_{20}$ | 11.80 | 6.30(4.23) | 6.61 | 13.43 | 7.99 | 6.99 | 3.47 | 7.38(5.61) | 5.88 | 7.06 |
| $C_{24}$ | 17.35 | 13.09(7.57) | 15.66 | 15.61 | 9.57 | 9.17 | 6.63 | 8.33(7.73) | 7.18 | 9.30 |
| $C_{28}$ | 18.69 | 16.66(11.40) | 18.46 | 16.43 | 10.58 | 10.22 | 11.46 | 11.55(11.70) | 10.17 | 11.29 |
| $C_{32}$ | 14.02 | 12.84(11.99) | 13.23 | 12.20 | 11.38 | 11.67 | 14.02 | 13.28 | 12.16 | 9.52 |

TABLE IV-continued
GAS CHROMATOGRAPH RESULTS OF HYDROGENATED BUTADIENE OLIGOMERS
(Composition by wt %)

| | | | | | | | | | | |
|---|---|---|---|---|---|---|---|---|---|---|
| $C_{36}$ ⎫ | 14.55 | 14.21(10.82) | 14.53 | 13.72 | 10.79 | 10.88 | 13.57 | 12.35(12.17) | 10.87 | 10.01 |
| $C_{40}$ ⎭ | 9.41 | 12.58(11.10) | 12.01 | 11.12 | 11.81 | 11.81 | 13.51 | 12.41(12.47) | 11.34 | 9.19 |
| $C_{44}$ | 4.86[b] | 12.43(36.35)[b] | | 8.59 | 26.22[b] | 29.23[b] | 31.44[b] | 26.34(30.24)[b] | 33.42[b] | 26.08[b] |
| $>C_{44}$ | | | 10.63[b] | | | | | | | |

| Sample | CC | DD | EE | FF | HH | II | JJ | KK | LL |
|---|---|---|---|---|---|---|---|---|---|
| Total Oligomers | | | | | | | | | |
| $C_8$ | 0.27 | 0.03 | 0.15 | 0.12 | 0.33 | 0.54 | — | — | — |
| $C_{12}$ | 2.84 | 1.83 | 25.30 | 18.35 | 16.45 | 11.77 | 5.02 | 4.71 | 5.67 |
| $C_{16}$ | 6.98 | 5.77 | 14.84 | 11.78 | 13.63 | 9.40 | 6.78 | 3.48 | 6.61 |
| $C_{20}$ | 9.46 | 5.71 | 9.15 | 10.95 | 11.72 | 8.40 | 6.86 | 4.30 | 7.48 |
| $C_{24}$ | 9.85 | 7.75 | 9.61 | 10.14 | 10.61 | 9.58 | 8.04 | 6.44 | 8.41 |
| $C_{28}$ | 9.66 | 7.57 | 8.69 | 9.28 | 10.22 | 9.50 | 8.90 | 8.08 | 9.55 |
| $C_{32}$ | 10.74 | 9.33 | 6.90 | 7.31 | 8.03 | 9.36 | 9.46 | 7.41 | 9.31 |
| $C_{36}$ | 10.67 | 7.91 | 5.73 | 6.51 | 7.00 | 9.91 | 10.74 | 8.14 | 10.47 |
| $C_{40}$ | 12.01 | 8.14 | 6.31 | 5.37 | 5.67 | 7.73 | 9.34 | 7.17 | 8.58 |
| $C_{44}$ | 25.85[b] | 45.84[b] | 13.31[b] | 20.21[b] | 16.35[b] | 23.74[b] | 9.90 | 9.07 | 8.51 |
| $>C_{44}$ | | | | | | | 23.87 | 32.83 | 24.6 |
| Lube Oil | | | | | | | | | |
| $C_{12}$ | 3.14 | 2.08 | 0.18 | 0.74 | 1.63 | 3.43 | 2.21 | 0.64 | 3.69 |
| $C_{16}$ | 6.58 | 5.78 | 0.58 | 4.53 | 2.27 | 4.25 | 2.05 | 0.43 | 4.84 |
| $C_{20}$ | 7.28 | 6.22 | 2.51 | 7.41 | 4.20 | 6.07 | 6.94 | 1.13 | 5.62 |
| $C_{24}$ | 8.70 | 8.52 | 12.33 | 17.11 | 18.30 | 13.03 | 8.67 | 6.25 | 8.55 |
| $C_{28}$ | 10.35 | 8.65 | 17.46 | 15.95 | 21.37 | 14.16 | 9.66 | 9.10 | 10.56 |
| $C_{32}$ | 11.89 | 10.71 | 14.77 | 12.71 | 17.28 | 13.97 | 10.27 | 8.44 | 10.37 |
| $C_{36}$ ⎫ | 11.86 | 9.09 | 12.38 | 11.35 | 15.21 | 14.81 | 11.66 | 9.25 | 11.66 |
| $C_{40}$ ⎭ | 12.26 | 9.37 | 8.79 | 7.67 | 9.68 | 11.53 | 10.14 | 8.11 | 9.53 |
| $C_{44}$ | 26.62[b] | 39.42[b] | 30.76[b] | 14.24[b] | 9.47[b] | 17.94[b] | 10.75 | 9.61 | 9.73 |
| $>C_{44}$ | | | | | | | 20.74 | 37.52 | 25.41 |

[a] Naphthalene impurity gave these high results for $C_{12}$ & $C_{16}$ hydrocarbons
[b] These peaks were combined.
[c] This sample was a combination of samples $H^1$, $H^2$ and $H^3$.
[d] The values in parentheses were those obtained after a final hydrogenation.

Discussion of Results

Graphs I, II and III, corresponding to Tables I, II and III, respectively, display the relationship between the extent of polymer branching (as measured by the methyl group/monomer ratio) and pour point. The graphs show that pour point tends to decrease with increased branching. In other words the more dominate the 1,2 addition mode during polymerization (and thus the more prevalent the ethyl branching) the lower the pour point of the resultant polymer.

Graph IV, corresponding to Table III, shows a similar relationship between the extent of polymer branching (as measured by the methyl group/monomer ratio) and viscosity index. The more extensive the 1,2 addition mode (and thus branching) the lower the viscosity index.

Graph V, also corresponding to Table III, shows the relationship between pour point and viscosity index. The relationship does not appear to be as nearly linear as the results depicted in the other graphs but the resultant curve indicates that pour point tends to increase with increased viscosity index.

Sample KK contained heavies and thus was not representative of the lube oil cuts under investigation. For this reason the sample was not included in either Graph IV or V.

From the data it is concluded that the hydrogenated 1,3-butadiene polymers characterized by a 1,2 addition structure of at least about 60% possess good pour points. More particularly it is concluded that mixtures of hydrogenated 1,3-butadiene polymers having an average 1,2 addition structure of at least about 60% possess good pour points.

All data points reflecting this limitation in Graphs II and III exhibited pour points of less than about −20° C. Although some of the samples in Graph I did not exhibit pour points this low, all samples within the inventive range possessed poured points below about 10° C.

In view of the relationship between pour point and viscosity index (see Graph IV) a higher viscosity index can be maintained by limiting the 1,2 addition structure percentage to less than about 70%. Thus a low molecular weight hydrogenated butadiene polymer having a 1,2 addition structure of at least about 60% but less than about 70% should exhibit both good pour point and good viscosity index properties.

If a very low pour point is desired in the synthetic lubricant, even at the expense of viscosity index, a hydrogenated polymer having a 1,2 addition structure percentage in excess of about 70% can be used. Viscosity index improvers can be employed to improve the viscosity index.

GRAPH I (FROM TABLE I)

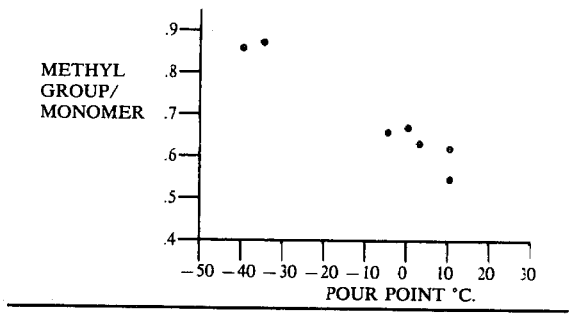

GRAPH II FROM TABLE II)

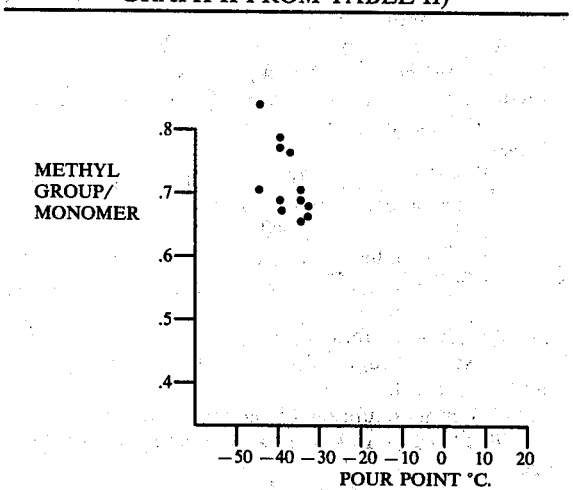

GRAPH III FROM TABLE III)

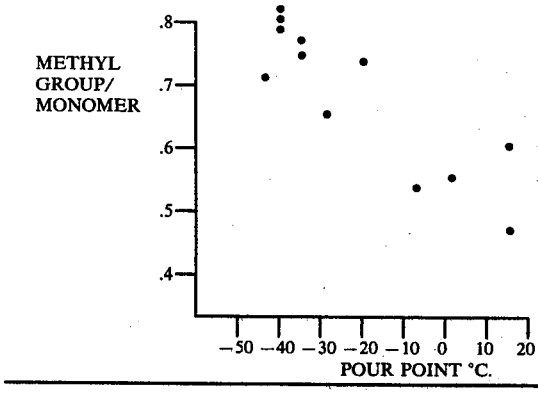

GRAPH IV FROM TABLE III)

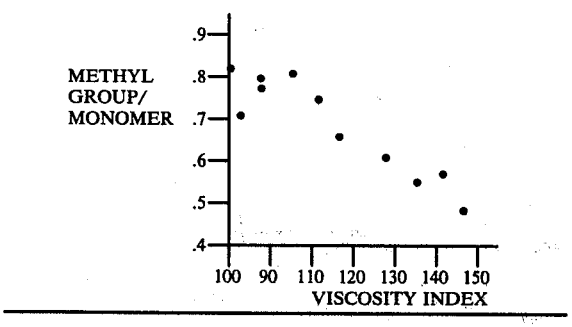

GRAPH V FROM TABLE III)

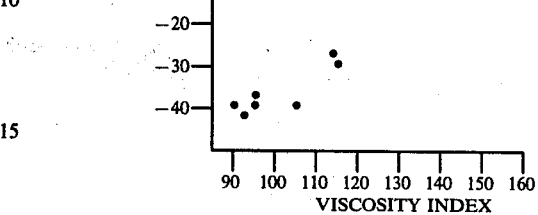

The foregoing examples have been given to aid in the disclosure of my invention and should not be interpreted so as to unduly limit the scope of my invention.

I claim:

1. A lubrication method which comprises positioning between two surfaces, at least one of which is movable with respect to the other, a lubricant to reduce friction between said surfaces; wherein said lubricant is of the formula

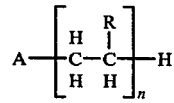

where A is a negative ion; wherein n is a whole number greater than 2; wherein each R in each

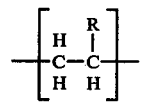

group is independently selected from the group consisting of H and —CH$_2$CH$_3$ such that at least about 60% of the R's are CH$_2$CH$_3$; and wherein the average molecular weight of said lubricant is within the range of about 150 to about 3,000.

2. A method in accordance with claim 1 wherein said average molecular weight is within the range of about 280 to about 600.

3. A lubrication method which comprises positioning between two surfaces, at least one of which is movable with respect to the other, a lubricant to reduce fraction between said surfaces; wherein said lubricant is hydrogenated 1,3-butadiene polymer having an average molecular weight within the range of about 150 to about 3,000; and wherein said polymer is characterized by an average 1,2 addition structure of at least about 60 percent.

4. A lubrication method in accordance with claim 3 wherein said average molecular weight is within the range of about 280 to about 600.

5. A lubrication method in accordance with claim 4 wherein said average 1,2 addition structure is less than about 70 percent.

6. A lubrication method in accordance with claim 4 wherein said average 1,2 addition structure is at least about 70 percent.

7. A synthetic lubricant of the formula

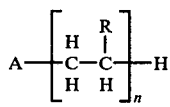

where A is a negative ion; wherein n is a whole number greater than 2; wherein each R in each

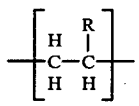

group is independently selected from the group consisting of H and —CH$_2$CH$_3$ such that at least about 60% of said R's are —CH$_2$CH$_3$; and wherein the average molecular weight of said lubricant is within the range of about 150 to about 3,000.

8. A lubricant in accordance with claim 7 wherein said average molecular weight is within the range of about 280 to about 600.

9. A synthetic lubricant comprising hydrogenated 1,3-butadiene polymer having an average molecular weight within the range of about 150 to about 3,000 and an average 1,2 addition structure of at least about 60 percent.

10. A synthetic lubricant in accordance with claim 9 wherein said average molecular weight is within the range of about 280 to about 600.

11. A synthetic lubricant in accordance with claim 10 wherein said average 1,2 addition structure is less than about 70 percent.

12. A synthetic lubricant in accordance with claim 10 wherein said average 1,2 addition structure is at least about 70 percent.

13. A synthetic lubricant in accordance with claim 7, 8, 9, 10, 11, 12 or 13 having a pour point below about −20° C.

* * * * *